(12) United States Patent
Fuchs

(10) Patent No.: US 9,471,304 B1
(45) Date of Patent: Oct. 18, 2016

(54) TREE-BASED VERSIONING AND MERGING

(71) Applicant: SAP SE, Walldorf (DE)

(72) Inventor: Matthias Fuchs, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/743,869

(22) Filed: Jun. 18, 2015

(51) Int. Cl.
*G06F 17/22* (2006.01)
*G06F 9/44* (2006.01)

(52) U.S. Cl.
CPC .. *G06F 8/71* (2013.01); *G06F 8/31* (2013.01)

(58) Field of Classification Search
None
See application file for complete search history.

(56) References Cited

U.S. PATENT DOCUMENTS

| | | | | |
|---|---|---|---|---|
| 2008/0071806 A1* | 3/2008 | Gaurav | ............... | G06F 17/2247 |
| 2010/0088676 A1* | 4/2010 | Yuan | ................. | G06F 17/30908 717/120 |
| 2014/0281873 A1* | 9/2014 | Frew | .................... | G06F 17/2288 715/229 |

\* cited by examiner

*Primary Examiner* — Tuan Dao
(74) *Attorney, Agent, or Firm* — Schwegman Lundberg & Woessner, P.A.

(57) ABSTRACT

In various example embodiments, a version control server controls the versioning and modification of source code by representing the source code as a tree structure. The tree structure includes various nodes, which represent constituent parts of the source code. Changes to the source code are reflected in changes to the tree structure, such as by deleting or inserting nodes. The version control server identifies a list of changes made to the source code via the tree structure, and obtains a successor version of the source code by applying a list of node changes. The version control server also manages changes to the source code by multiple users by recording and associating the tree structure of the source code when it was checked-out by each user. When a user checks the source code back in, attempts to modify the source code by merging and/or modifying the corresponding tree structure.

18 Claims, 20 Drawing Sheets

TREE-BASED VERSIONING AND MERGING

TECHNICAL FIELD

Embodiments of the present disclosure relate generally to data processing and analysis and, more particularly, but not by way of limitation, to a version control server that manages revisions and changes to source code by modifying a corresponding tree representation of the source code.

BACKGROUND

Version control software allows developers to obtain a copy of source code for a computer program, make changes to the source code, and then save those changes as a version of the source code for later use. However, when multiple developers are working on the same source code, there can be merging conflicts when the changes are ready to be applied. In particular, typical version control software is text-based and, when merging is performed on multiple copies of modified source code, the version control software will introduce errors that are the result of typographical or semantic preferences. For example, one developer may prefer to use braces at one point of his or her source code, whereas another developer may prefer to use braces at another point. These types of typographical differences introduce errors into the merged source code that could have been otherwise avoided.

Further still, when the version control software attempts to merge modified source code from different developers, the standard version control software often reports merge conflicts that are the result of formatting choices or other modifications that have no bearing on the semantics of the actual source code. In addition, each time a merge conflict is detected and requires manual resolution. Thus, text-based version control software often has a higher rate of merge conflicts that could be avoided and reduce the time needed to commit changes to source code.

BRIEF DESCRIPTION OF THE DRAWINGS

Various ones of the appended drawings merely illustrate example embodiments of the present disclosure and should not be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, this disclosure provides a version control server that facilitates the merging of modifications to source code by different users. The version control server employs various modules that convert and represent source code as tree structures, where the nodes of the tree include constituent parts of the source code. These constituent parts include parameters (e.g., variables), values (e.g., values assigned to the parameters), code function types (e.g., whether a given block of code is a method, a conditional statement, a declaration, etc.), and other such constituent parts. The version control server uses rules and other logic to parse the source code for a given file, and then convert said source code into a corresponding tree representation. In this manner, the source code for each file retained by the version control server is associated with its corresponding tree representation.

With a version control server, users accessing the server are presented with an option for "checking out" a copy of a requested file. With conventional text-based versioning tools, these tools often highlight changes that are syntactic, which leads to an increase in merging conflicts. However, with the version control server of the present disclosure, the source code of the checked-out file is converted to a tree representation, which can be merged with tree representations of the source code modified by the various users. While there may be conflicts in the merging of the various tree representations, such as where first a user deletes entire portions of source code that a second user is concurrently modifying in another version of the file, these conflicts are significantly reduced. Thus, the disclosed systems and methods provide a technical advantage over conventional version control software and development environment.

Figure 1:
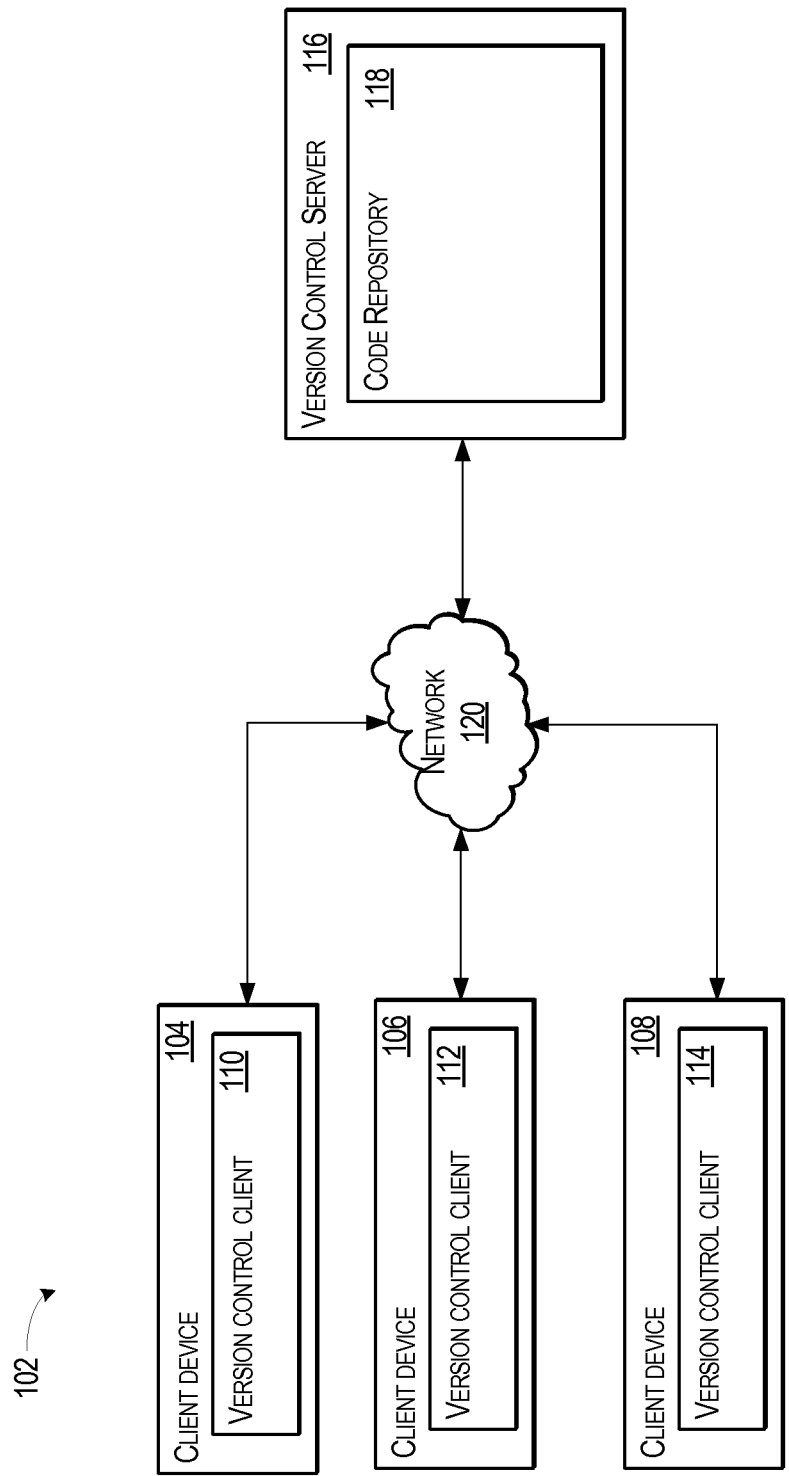
FIG. 1 is a block diagram illustrating a networked environment, in accordance with one embodiment, in which a version control server is in communication with various client devices.

FIG. 1 is a block diagram illustrating a networked environment 102, in accordance with one embodiment, in which a version control server 116 is in communication with various client devices 104-108 via a network 120. The version control server 116 provides server-side functionality via a network 120 to one or more client devices 104-108. The version control server 116 further includes a code repository 118 that includes one or more files having source code accessible by the client devices 104-108.

The one or more client devices 104-108 are configured to execute one or more types of client application, such as the version control clients 110-114, to access the version control server 116. One example of a version control client is the Eclipse Integrated Development Environment ("IDE"), which provides version control clients for various development environments of computer programming and scripting languages, such as a Java IDE, C/C++, PHP, and other such languages. While the Eclipse IDE is one example, other standalone version control clients may also be used, such as Git, Mercurial, Bazaar, Dares, or other such version control clients.

The client devices 104-108 may comprise, but are not limited to, a mobile phone, desktop computer, laptop, portable digital assistants (PDAs), smart phones, tablets, ultrabooks, netbooks, laptops, multi-processor systems, microprocessor-based or programmable consumer electronics, game consoles, set-top boxes, or any other communication device that a user may utilize to access the resources available from the version control server 116. In some embodiments, the client devices 104-108 may comprise a display module (not shown) to display information. In further embodiments, the client devices 104-108 may comprise one or more of a touch screens, accelerometers, gyroscopes, cameras, microphones, global positioning system (GPS) devices, and so forth. The client devices 104-108 may be a device of a user that is used to access a user account associated with the user and stored by the version control server 116. As discussed below, and in one embodiment, the version control server 116 leverages user accounts to associate a snapshot of the current tree representation of the source code being checked out by a given user with the user account. In this manner, the last known tree representation of the source code is known prior to any modifications made by the user associated with the corresponding user account.

One or more users of the client devices 104-108 may be a person, a machine, or other means of interacting with the client devices 104-108. In various embodiments, the users of the client devices 104-108 are not part of the network environment 102 shown in FIG. 1, but may interact with the version control server 116 via the client devices 104-108 or another means. For instance, the user provides input (e.g., touch screen input or alphanumeric input) to the client device 104 and the input is communicated to the version control server 116 via the network 120. In this instance, the version control server 116, in response to receiving the input from the user, communicates information to the client devices 104-108 via the networks 120 to be presented to the user. In this way, the user can interact with the version control server 116 using the client devices 104-108.

The network 120 may include a variety of networks for facilitating communications between the client devices 104-108 and the version control server 116. For example, the network 120 include one or more portions of an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The version control server 116 includes a code repository 118 for providing files containing source code to one or more of the client devices 104-108. The code repository may be implemented as a distributed database, a relational and/or hierarchical database, one or more flat files, or as any other type of code repository. As discussed below with reference to FIG. 2, the version control server 116 includes various modules and data for converting the source code stored by the code repository 118 into their corresponding tree representations, and for merging such tree representations when changes to the source code are made by one or more of the users of the client devices 104-108.

Figure 2:
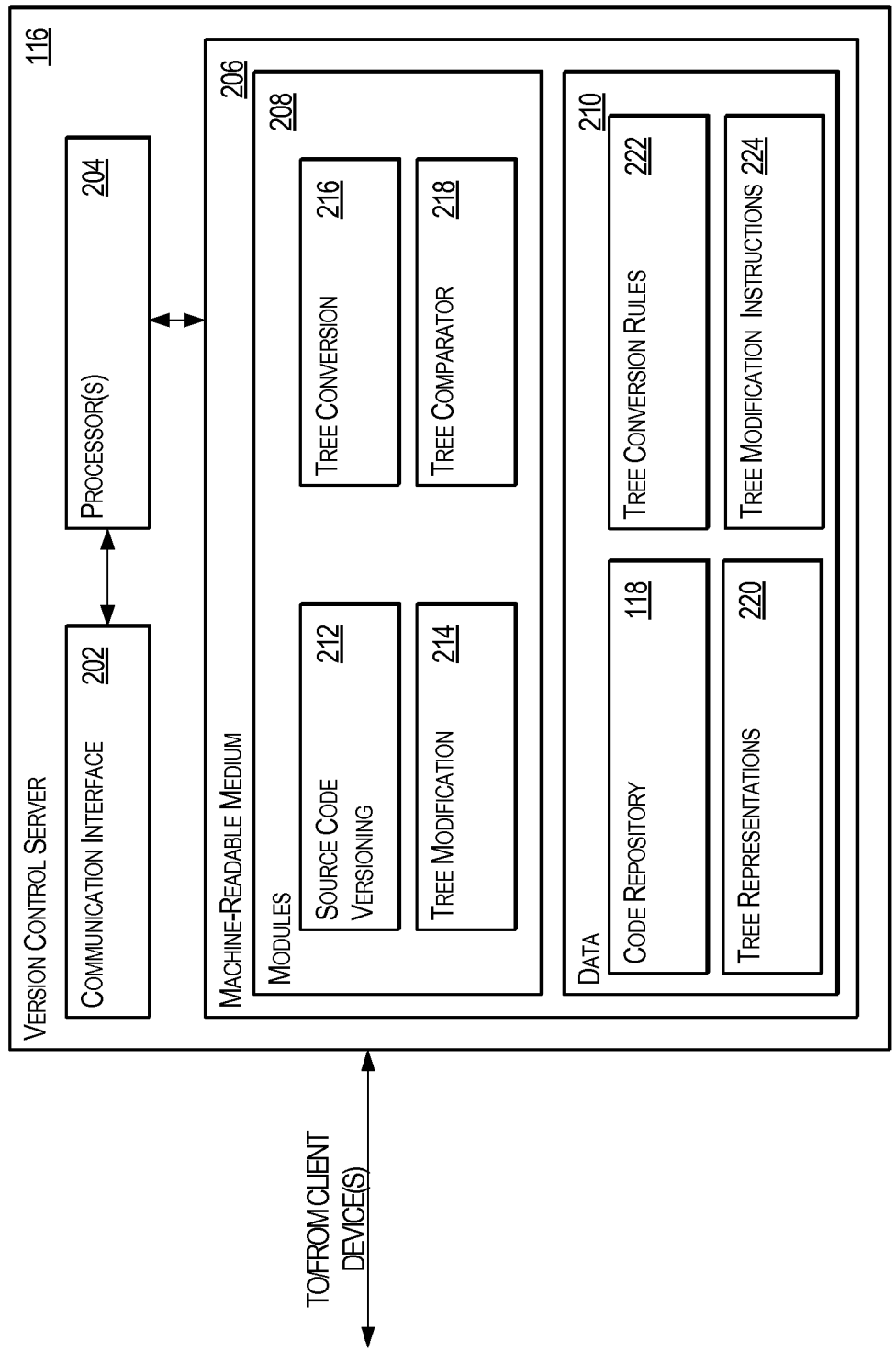
FIG. 2 is a block diagram illustrating the components of the version control server of FIG. 1 in accordance with an example embodiment.

Referring to FIG. 2 is a block diagram illustrating the components of the version control server 116 of FIG. 1 in accordance with an example embodiment. In one embodiment, the version control server 116 includes one more communication interfaces 202 in communication with one or more processors 204. The one or more processors 204 are communicatively coupled to one or more machine-readable mediums 206, which include modules 208 for converting source code into their corresponding tree representations and data 210 to support the execution of the modules 208.

The various functional components of the version control server 116 may reside on a single device or may be distributed across several computers in various arrangements. The various components of the version control server 116 may, furthermore, access one or more databases, and each of the various components of the version control server 116 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, Qualcomm, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the version control server 116 and the various client devices 104-108. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combination of such wired and wireless interfaces.

The machine-readable medium 206 includes various modules 208 and data 210 for implementing the disclosed tree-based conversions and merging. The machine-readable medium 206 includes one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as a "cloud-based" storage systems or storage networks that include multiple storage apparatus or devices. As shown in FIG. 2, the machine-readable medium 206 excludes signals per se.

In various embodiments, the modules 208 include a source code versioning module 212, a tree modification module 214, a tree conversion module 216, and a tree comparator module 218. In various embodiments, the version control server 116 may include different or additional modules.

The source code versioning module 212 configures the one or more processor(s) 204 to manage the source code stored in the source code repository 118. In one embodiment, the source code versioning module 212 communicates with a corresponding version control client (e.g., version control clients 110-114) to provide the version control client with a copy of a version of a given file. As copies of the given file are requested, the source code versioning module 212 keeps track (e.g., monitors) the number of copies that have been requested, the number of copies that have been returned (e.g., "checked-in"), the user that requested a given copy, and other such metrics. In one embodiment, the source code versioning module 212 employs a predetermined and/or configurable expiration timer that establishes a deadline for when a given copy should be "checked-in". The expiration timer may be associated with the user that requested the given copy of the file. The expiration timer is particularly useful where the given file is being heavily requested and/or modified; in such instances, older versions of the given file are likely to have substantial conflicts with later versions of the given file. Thus, the expiration timer could be leveraged to prevent older versions of a file from being checked-in. Alternatively, the source code versioning module 212 employs a version tracker that monitors the version number (e.g., "version 2," "version 2.1," "version 2.2," etc.) of file being checked-out. Like the expiration timer, the version tracker may include a version threshold that signifies when a copy of a file could no longer be checked-in. For example, where a first user requests a copy of "version 2.2" of a file, the version threshold is set at "3 minor revisions," and later users modify the file such that the resulting version is "version 2.6," the first user may no longer be able to check-in his or her changes as the copy of the file the first user requested is now beyond the version threshold.

The tree conversion module 216 converts the source code of a given file to its corresponding tree representation. The tree representation of the given file may be coded using any suitable computer programming or scripting language, such as Java, C++, C, PHP, Lisp, or any other such computer programming or scripting language.

As discussed with reference to FIG. 3 below, the tree conversion module 216 leverages one or more tree conversion rules 222 to parse the source code of a given file, and convert such source code into its corresponding tree representation. The tree conversion module 216 is further accessible by other modules 208 of the version control server 116, such that the other modules 208 can invoke the tree conversion module 216 upon request. As discussed below with reference to FIGS. 6A-10B, the source code versioning module 212 invokes the tree conversion module 216 at the time a user checks out a given file and when the user checks the file back in. The source code versioning module 212 may also invoke the tree conversion module 216 when a file is first added to the code repository 118 such that an original tree representation of the file can be referenced in the event that the original version of the file needs to be referenced.

The tree comparator module 218 is configured to compare two tree representations of a given file. In one embodiment, the tree comparator module 218 compares each node at a given level of a first tree representation with each node at the same level of the second tree representation. In another embodiment, the tree comparator module 218 employs a recursive tree comparison, comparing the respective nodes of the old (original) tree and the new (modified) tree from root to leaves. In its simplest form, the comparison marks any node (and all its sub-nodes) of the old tree that differs from its counterpart in the new tree as "deleted" and the counterpart (and all its sub-nodes) as "inserted" at the position of deletion, thus creating a "delete sub-tree T1" and a corresponding "insert sub-tree T2" instruction. In yet further embodiments, the tree comparator module 218 may use various combinations of such tree comparison algorithms. As discussed below with reference to FIGS. 6A-10B, the result of the comparison may yield a set of differences, which the tree conversion module 216 may be configured to convert to one or more tree modification instructions 224. In another embodiment, the tree modification instructions 224 may represent instructions for modifying a current tree representation of a given source code, such that current tree representation is modified to reflect changes to the given source code. Alternatively, the result of the comparison may yield a conflict, which may cause the tree comparator module 218 to request moderation of the differences.

Finally, the modules 208 include a tree modification module 214, which is configured to modify a current tree representation of a given file based on the differences identified by the tree comparator module 218. In one embodiment, the tree modification module 214 is provided and/or retrieves the tree modification instructions 224, which it then uses to modify a current tree representation for the source code of a given file. An example of modifying a tree representation based on tree modification instructions 224 is discussed with reference to FIGS. 6B-10B.

Figure 3:
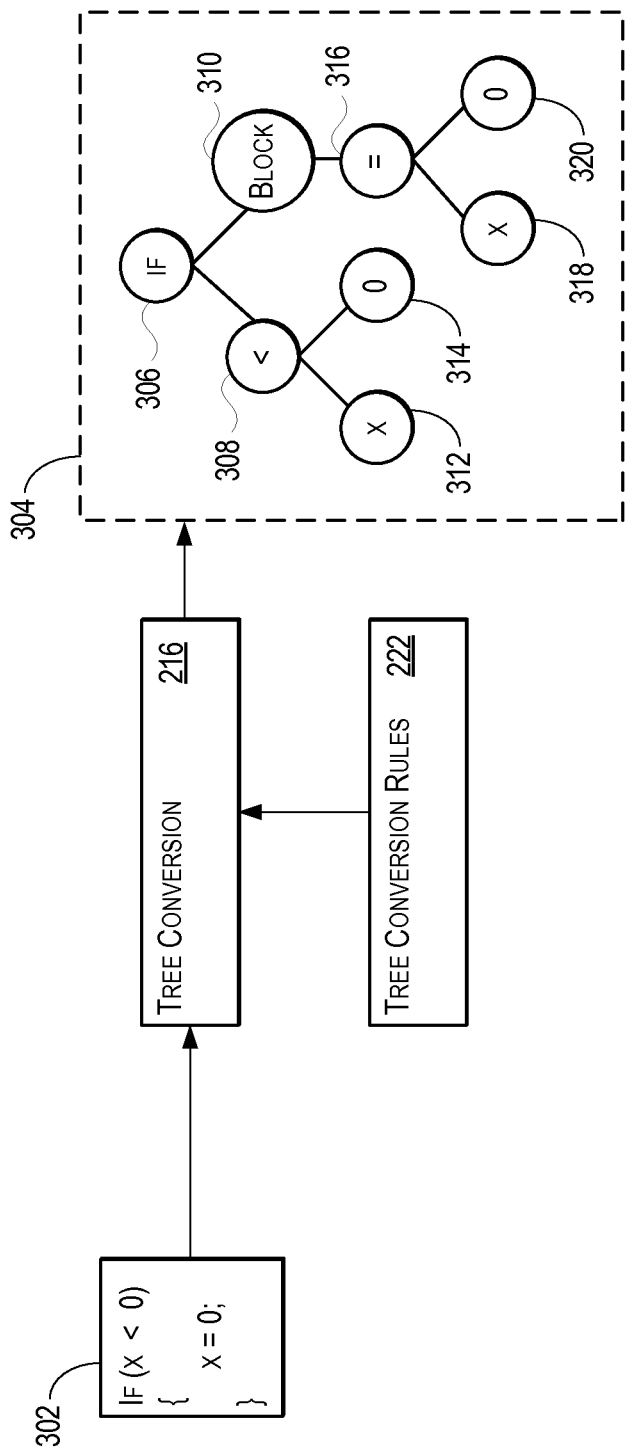
FIG. 3 illustrates the conversion of source code to its tree representation in accordance with an example embodiment.

Referring to FIG. 3 is an example embodiment 302 of converting source code 304 its tree representation 304 via the tree conversion module 216 loaded with the tree conversion rules 222 in accordance with an example embodiment. As shown in FIG. 3, the tree representation 304 comprises a set of nodes 306-320, where each node represents a constituent part of the source code 304. As the tree conversion module 216 parses the source code 304, it assigns the constituent parts to a corresponding node based on one or more tree conversion rules 222. In one embodiment, the tree conversion rules 222 define that constituent parts include, but are not limited to, control words (e.g., "if", "while," "case," "do," etc.), variables (e.g., declared and undeclared variables), parameters for a given function or method, values assigned or assignable to a given parameter, and mathematical or programmatic operators. In addition, the tree conversion module 216 assigns source code identifiers (e.g., "declaration," "block," "method," etc.) for different types of source code defined by the tree conversion rules 222. Types of source code include, but are not limited to, method declarations, variable declarations, constant declarations, code blocks defined by one or more delimiters (e.g., braces, brackets, parentheses, etc.), and other such types of source code. Furthermore, the tree conversion rules 222 are configurable such that additional types of source code can be added if further granularity is desired for representing a given source code as a tree structure.

In this manner, the tree conversion module 216 operates on the source code 302 to convert it to its tree representation 304. Thus, the term "IF" (e.g., a control word) is assigned to the root node 306, where the root node 306 has two child nodes 308-310, namely, the "less than" operator (e.g., "<", which is a mathematical operator) and a source code identifier for the block of code that should execute provided that the conditional statement of the source code 302 is evaluated as "true" (e.g., "x" is less than zero).

Figure 4:
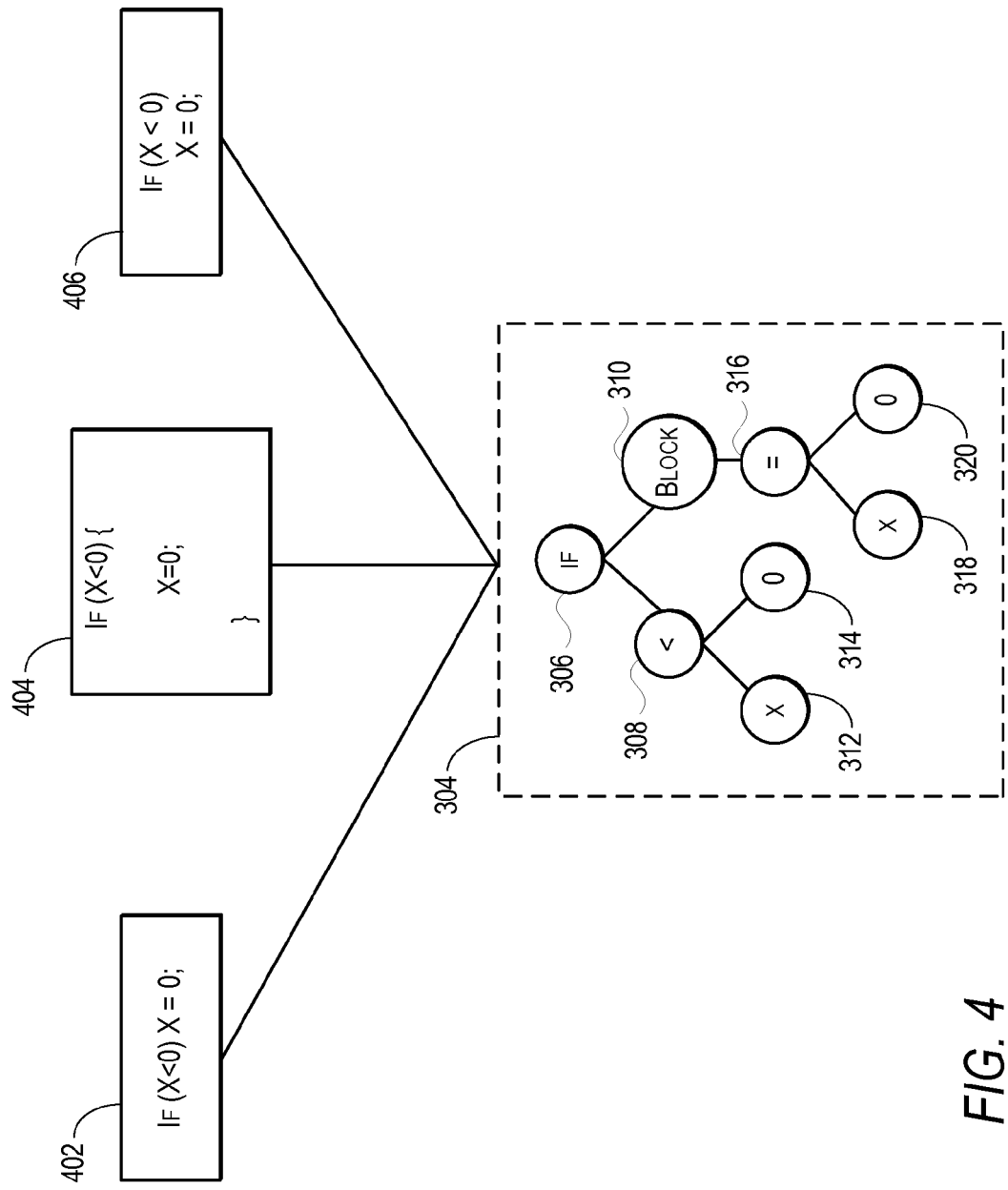
FIG. 4 illustrates how syntactically different, but functionally equivalent, source code can be represented by the same tree representation in accordance with an example embodiment.

One of the technical advantages of the disclosed systems and methods is that syntactically different, but functionally equivalent, source code can be compared based on their respective tree representations. As an example, FIG. 4 illustrates an example embodiment. In FIG. 4, three syntactically different segments 402-406 of source code perform functionally equivalent operations. With a text-based versioning tool or text-based comparison application, these segments 402-406 would be reported as being different segments of code. However, this reporting would, in fact, be a false positive. In contrast, and as shown in FIG. 4, with the disclosed systems and methods, each of the segments 402-406 are representable as the tree representation 304, which does not vary between the segments 402-406. Thus, the disclosed tree-based versioning and merging techniques have the added advantage of reducing the number of false positives for changes in source code.

Figure 5:
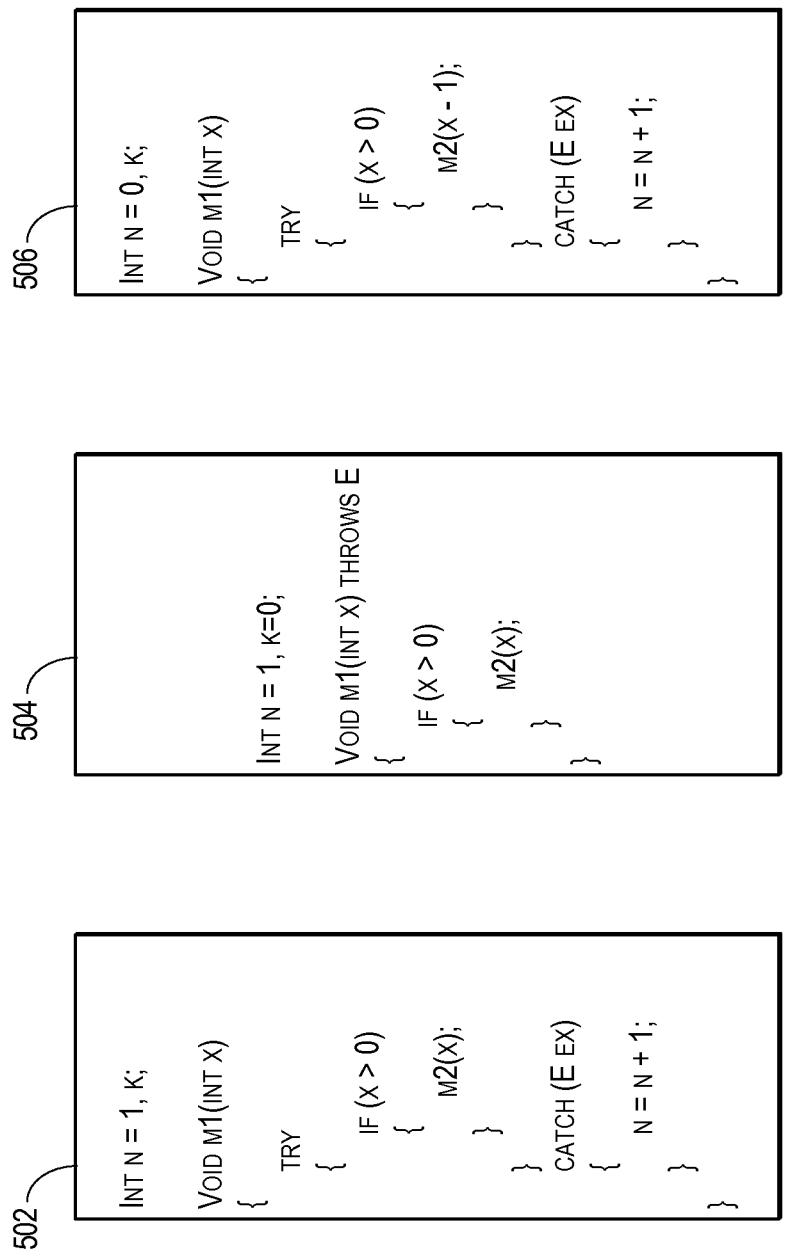
FIGS. 5-10B illustrate modifying source code through its tree representation in accordance with an example embodiment.

Turning to FIG. 5 are three segments 502-506 of source code from a file whose tree representations are discussed in FIGS. 6A-10B, which are used to illustrate an example of modifying source code in accordance with an example embodiment. In the example segments 502-506, an assumption is made that the method "m2" potentially throws an exception. In this example, the first segment 502 is the original source code. A first developer, D1, checks out the source code represented by the first segment 502. When D1 checks out the file containing the first segment 502, the source code versioning module 212 invokes the tree conversion module 216 to create a snapshot of the tree representation of the file, and associates this snapshot with D1.

Further in this example, a second developer, D2, then checks out the file containing the first segment 502. Similarly, the source code versioning module 212 invokes the tree conversion module 216 to create a second snapshot of the tree representation of the file, and associates this second snapshot with D2.

While the first segment 502 is checked out to D1, he or she removes the "TRY-CATCH" operation and adds a "THROWS" clause instead, the changes of which are illustrated in the second segment 504. For purposes of this example, D2 concurrently fixes a bug caused by not subtracting 1 from "X" when calling "m2", and he or she also changes the initial value of the variable "N." The changes by D2 are represented by the third segment 506.

Sometime later, each of the developers D1 and D2 check in their respective changes. It is presumed in this example that the changes made by D1 are successfully committed to the file containing the first segment 502. In summary, the operations of committing the changes made by D1 include determining whether any modifications had been made to the file since D1 had checked out the file, converting the source code modified by D1 into a tree representation, and comparing the snapshot associated with D1 with the tree representation of the modified source code to obtain a list of tree modification instructions. Presuming that no modifications had been made since D1 checked out the file, the operations further include modifying the snapshot with the tree modification instructions and, if applicable, converting the modified snapshot back to its source code implementation.

Figure 6A:
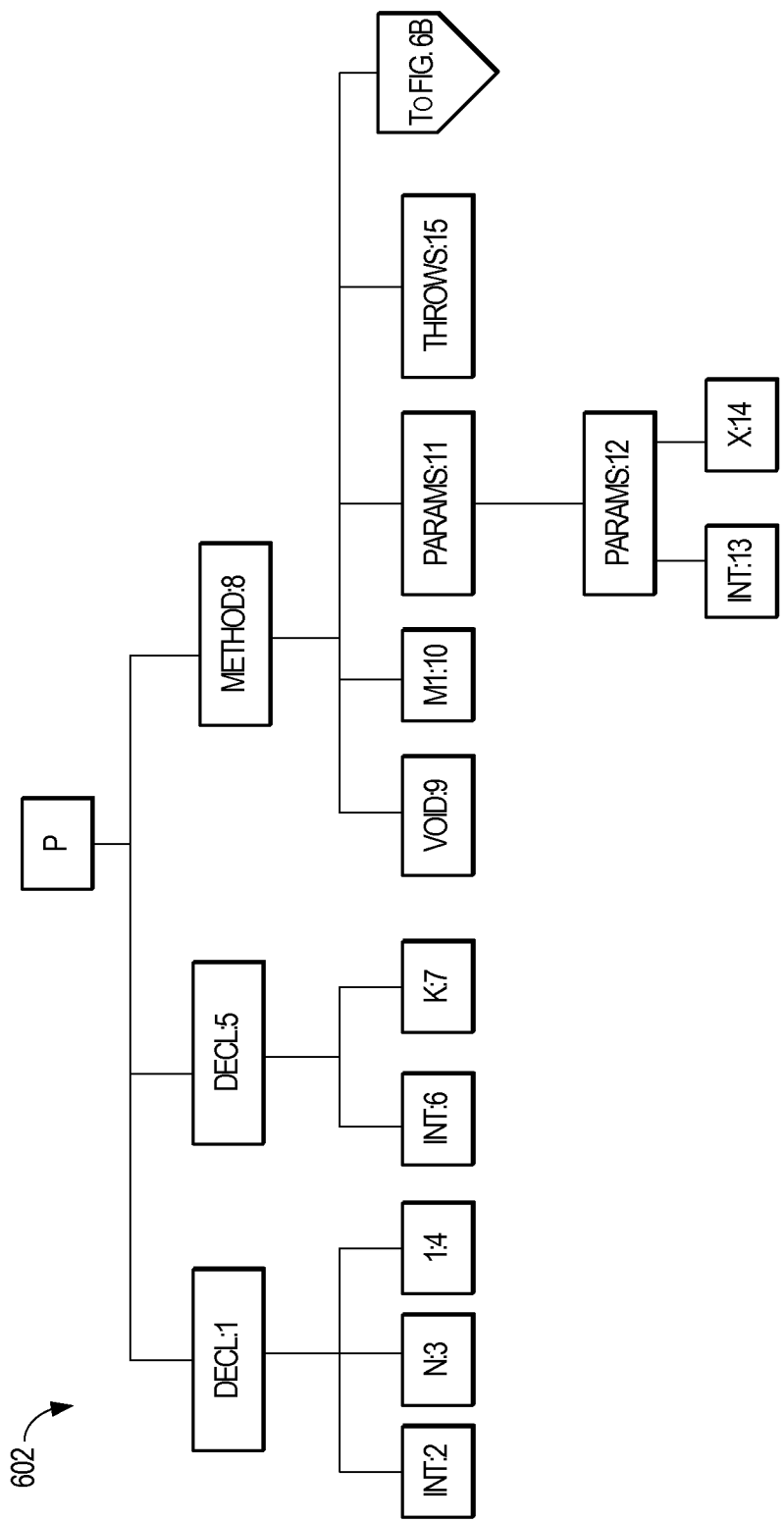
Figure 6B:
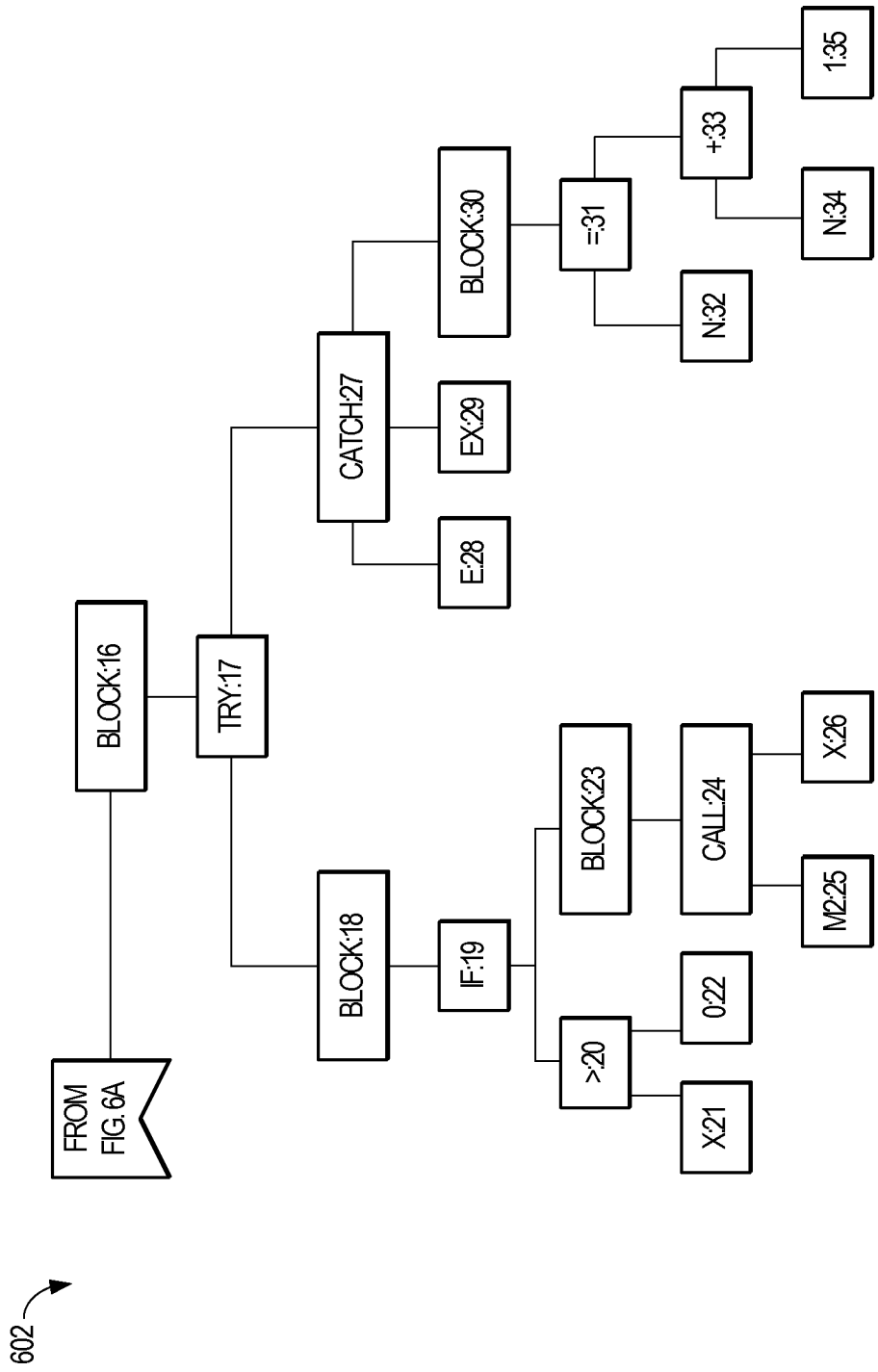

To commit the modifications made by D2, the version control server 116 leverages various tree representations of the code segments 502-506. FIGS. 6A-6B illustrate a first tree representation 602 of the first code segment 502. The first tree representation 602 is obtained by invoking the tree conversion module 216 on the first code segment 502. As shown in FIGS. 6A-6B, each node of the first tree representation 602 includes a unique identifier that identifies the node. When the tree conversion module 216 is first invoked on the first code segment 502, the tree conversion module 216 assigns each of the nodes a corresponding unique identifier. Thereafter, in subsequent iterations of the tree conversion module 216, the unique identifiers are inherited from prior instantiations of the tree representation. Thus, a unique identifier for a corresponding node stays with that node until the node is deleted or until the tree representation changes such that the node no longer exists in the tree representation (e.g., when the parent node of the node is deleted). As discussed above, a snapshot (e.g., a copy) of the first tree representation 602 may be associated with D2 when D2 checks out the file containing the first code segment 502.

Figure 7A:
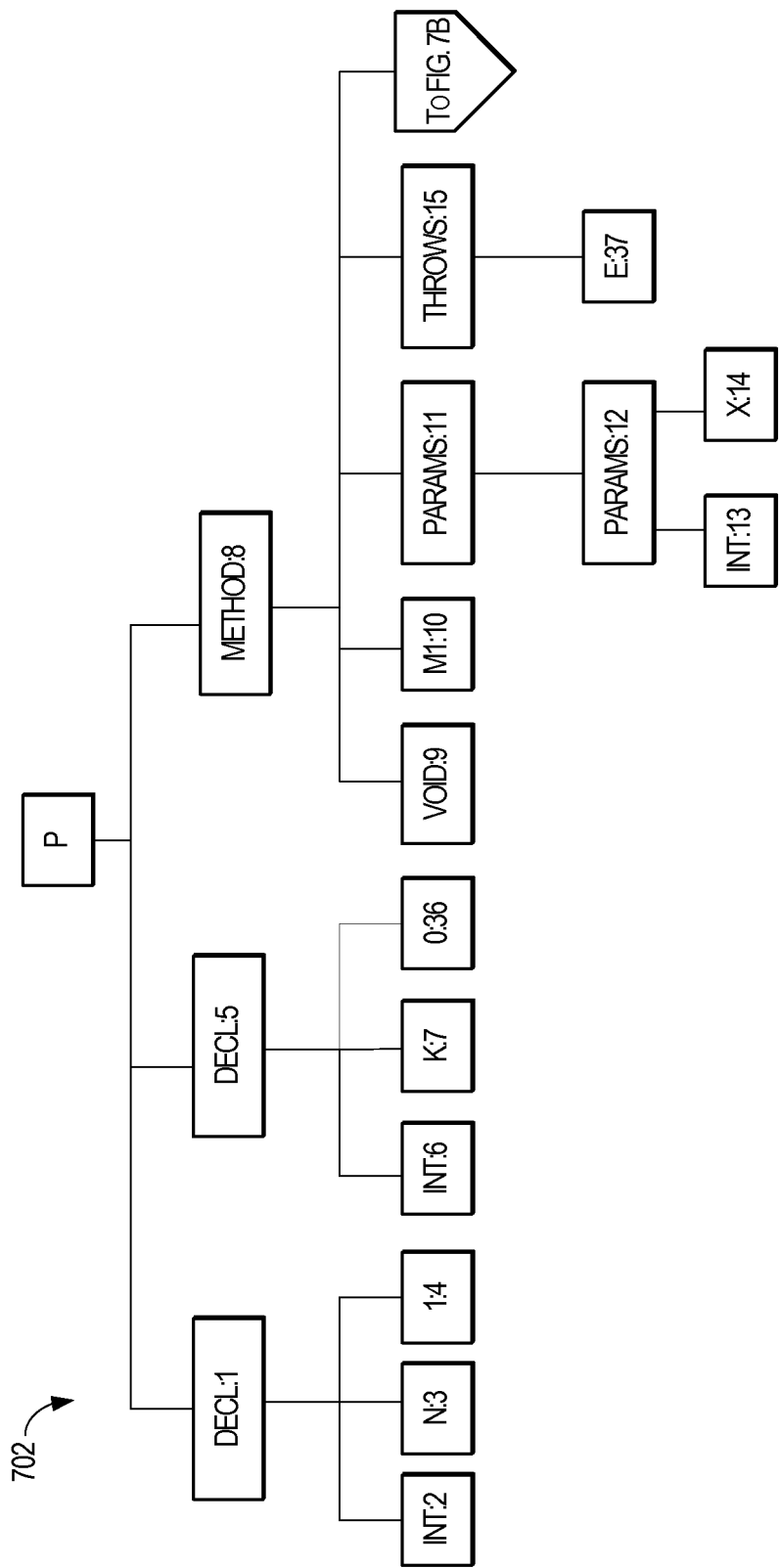
Figure 7B:
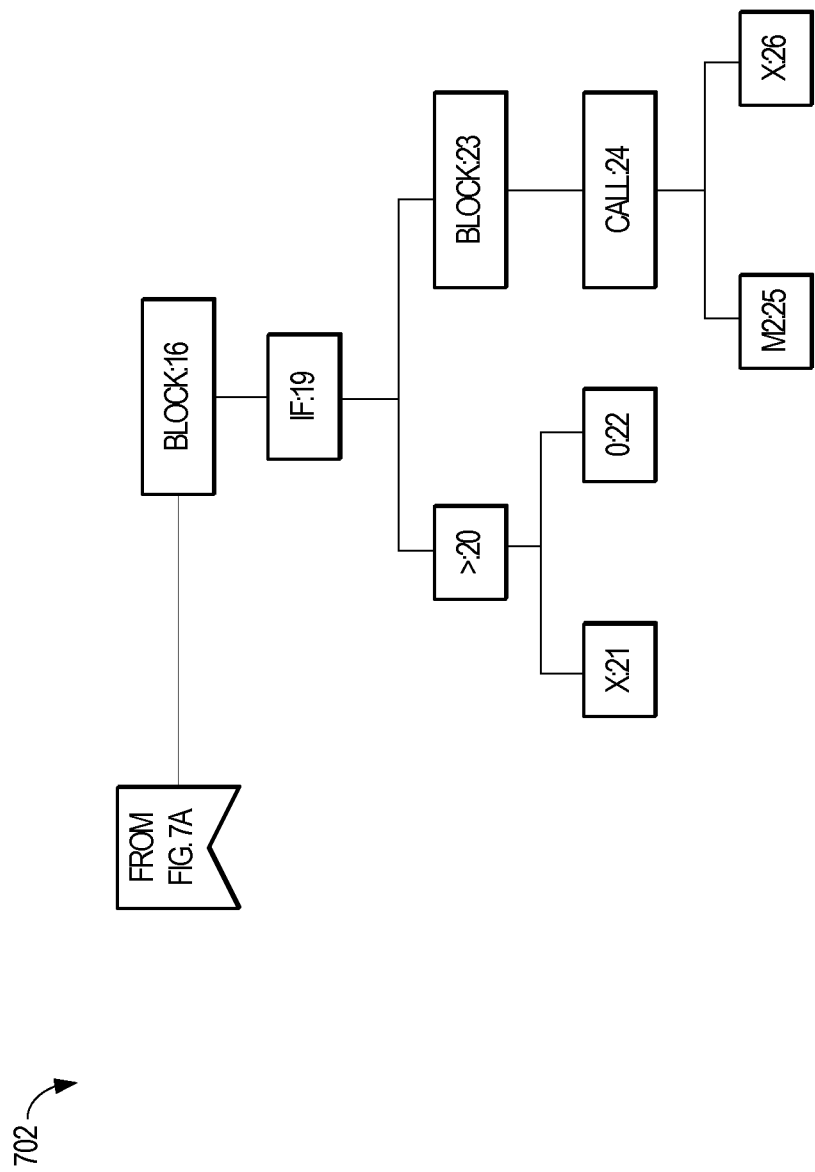

FIGS. 7A-7B illustrate a second tree representation 702 corresponding to the second code segment 504 in accordance with an example embodiment. As with the first tree representation 602, the second tree representation 702 is obtained by invoking the tree conversion module 216 on the second code segment 504. Like the first tree representation 602, each of the nodes of the second tree representation 702 are associated with a unique identifier. The unique identifier for a node in the second tree representation 702 may be obtained when the second tree representation 702 is compared with the first tree representation 602 (e.g., via the tree comparator module 218), and corresponding nodes are identified in the first tree representation 602 and the second tree representation 702. Nodes that appear in the second tree representation 702 that do not appear in the first tree representation 602 may be assigned a new, unique identifier.

In the embodiment shown in FIGS. 7A-7B, it is presumed that the tree comparator module 218 is configured to recognize that the child of "BLOCK:18" can be left intact and "lifted up" to become a direct child of "BLOCK:16." In an alternative embodiment, the tree comparator module 218 associated a new identifier with the nodes that are descendants of "BLOCK:16". In this alternative embodiment, there may be a higher probability of conflicts that may require moderation to resolve, but such conflicts would be identified by the tree modification module 214.

Figure 8A:
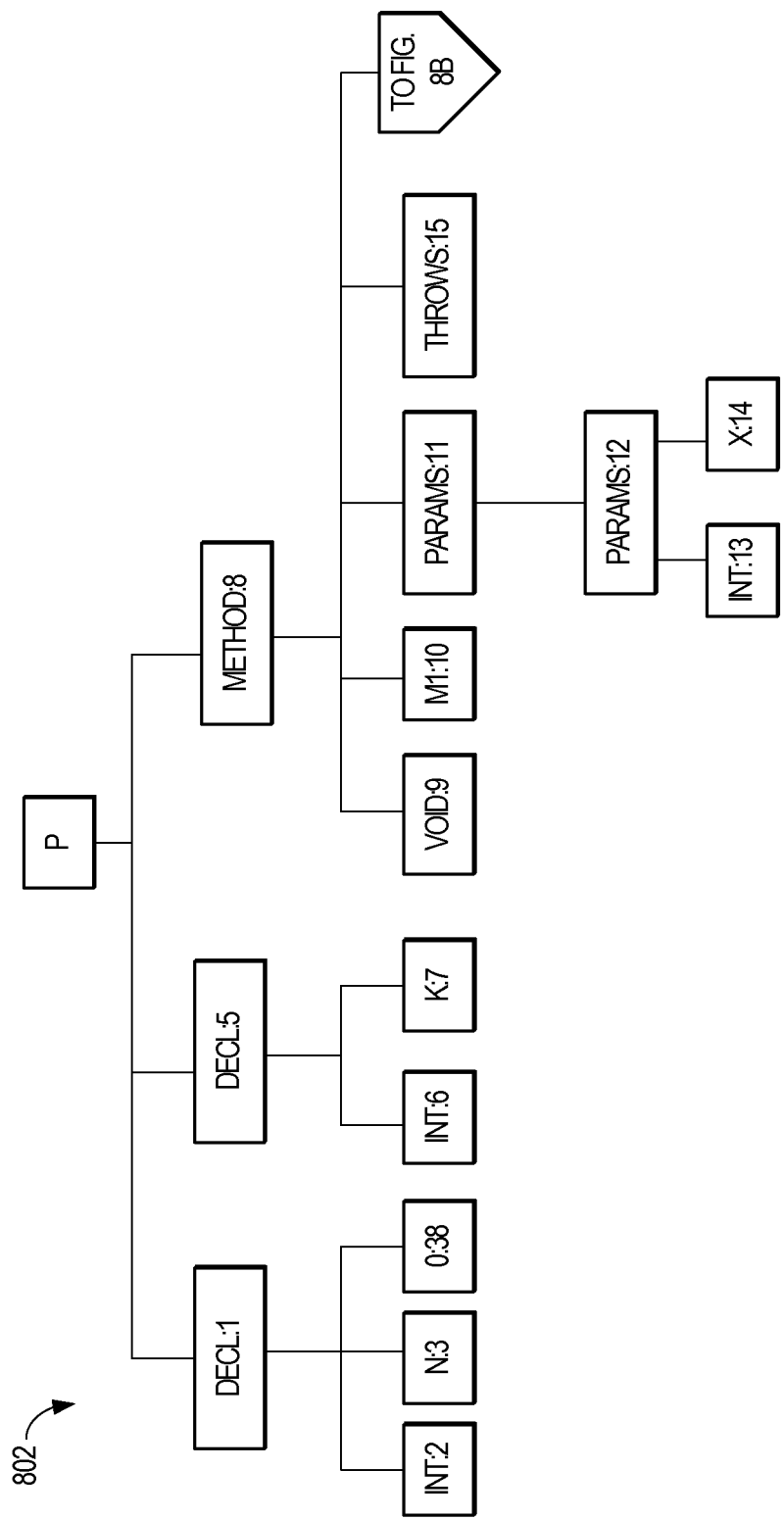
Figure 8B:
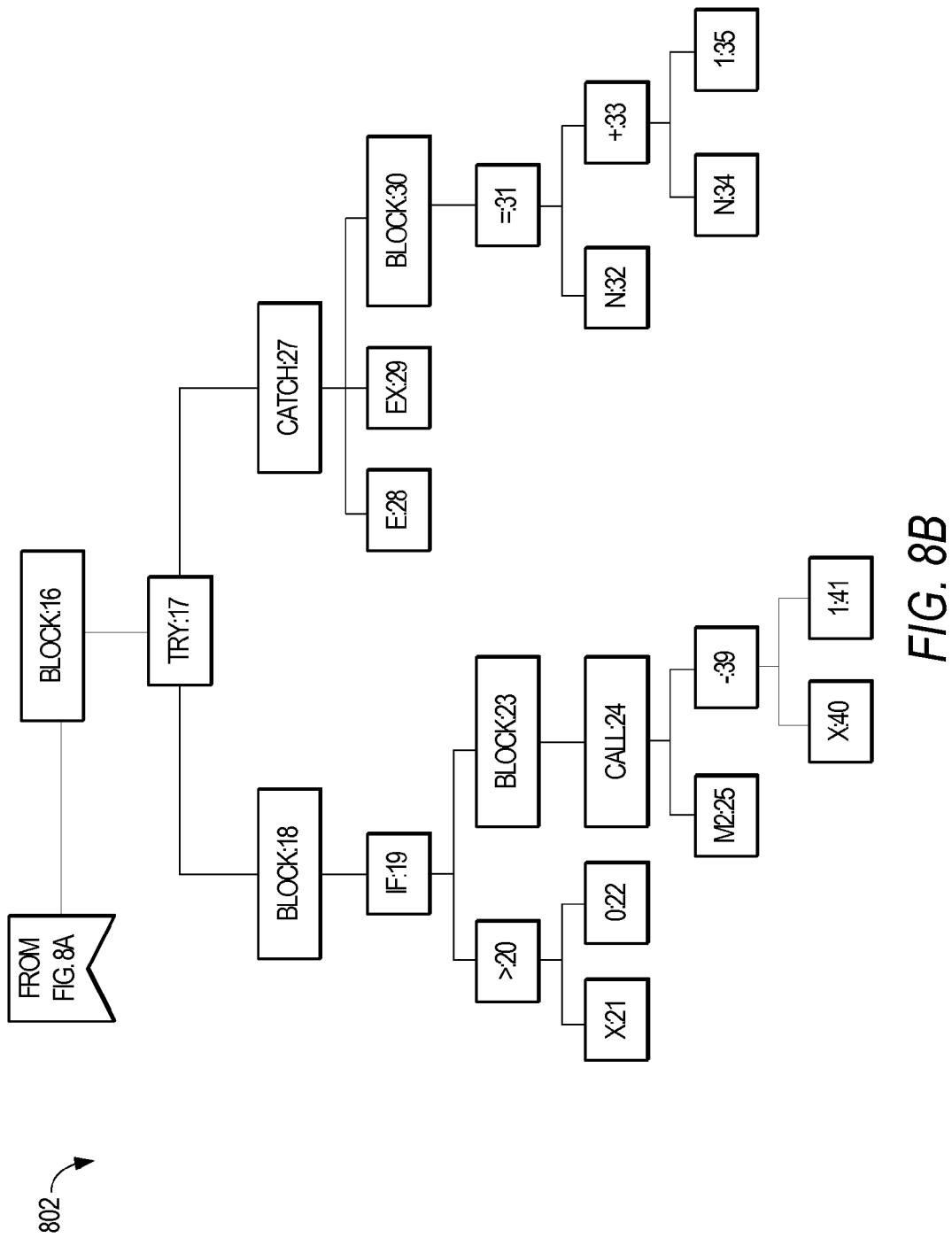

FIGS. 8A-8B illustrate a third tree representation 802 corresponding to the third code segment 506 in accordance with an example embodiment. The third tree representation 802 is obtained by invoking the tree conversion module 216 on the third code segment 506. As with the second tree representation 702, each of the nodes of the third tree representation 802 are associated with a unique identifier. However, the identifiers for the nodes of the third tree representation 802 may be obtained by comparing the nodes of the third tree representation 802 with the nodes of the snapshot of the first tree representation 602 previously associated with D2 (e.g., via the tree comparison module 218). In one embodiment, this is performed when the source code versioning module 212 receives the source code from D2, including the third code segment 506, and determines that the source code has changed or has been modified since D2 checked it out.

After the tree conversion module 216 has obtained the third tree representation 802 and has assigned node identifiers accordingly, the version control server 116 invokes the tree comparator module 218 to obtain a list of tree modification instructions 224 that transform the snapshot of the first tree representation 602 into the third tree representation 802. One of ordinary skill in the art will recognize that the tree modification instructions 224 may also be obtained at the time the tree comparator module 218 is invoked to obtain node identifiers for the third tree representation 802.

The tree modification instructions 224 include instructions that modify a first tree representation to a second tree representation. In particular, and in one embodiment, a tree modification instruction includes an action and a node identifier associated with the action. For example, the tree modification instructions 224 obtained by the tree comparator module 218 after comparing the snapshot of the first tree representation 602 with the third tree representation 802 may include:

delete 4
delete 26
insertChild(1,3,0:38)
insertChild(24,2,-:39, . . . )

The above tree modification instructions instruct the tree modification module 214 that the snapshot of the first tree representation 602 can be modified to the third tree representation 802 by deleting the node associated with the identifier "4", deleting the node associated with the identifier "26," and inserting various child nodes. The instruction insertChild(parent, position, child) signifies that the "child" of the insertChild instruction should be inserted as a child node of the "parent" at the given "position." In some instances, a conflict may result where an insertChild instruction is provided for a parent node that does not exist (e.g., where the modifications to the source code have resulted in the parent node in being deleted or removed). In these instances, the tree modification module 214 may request moderation of this conflict.

Figure 9A:
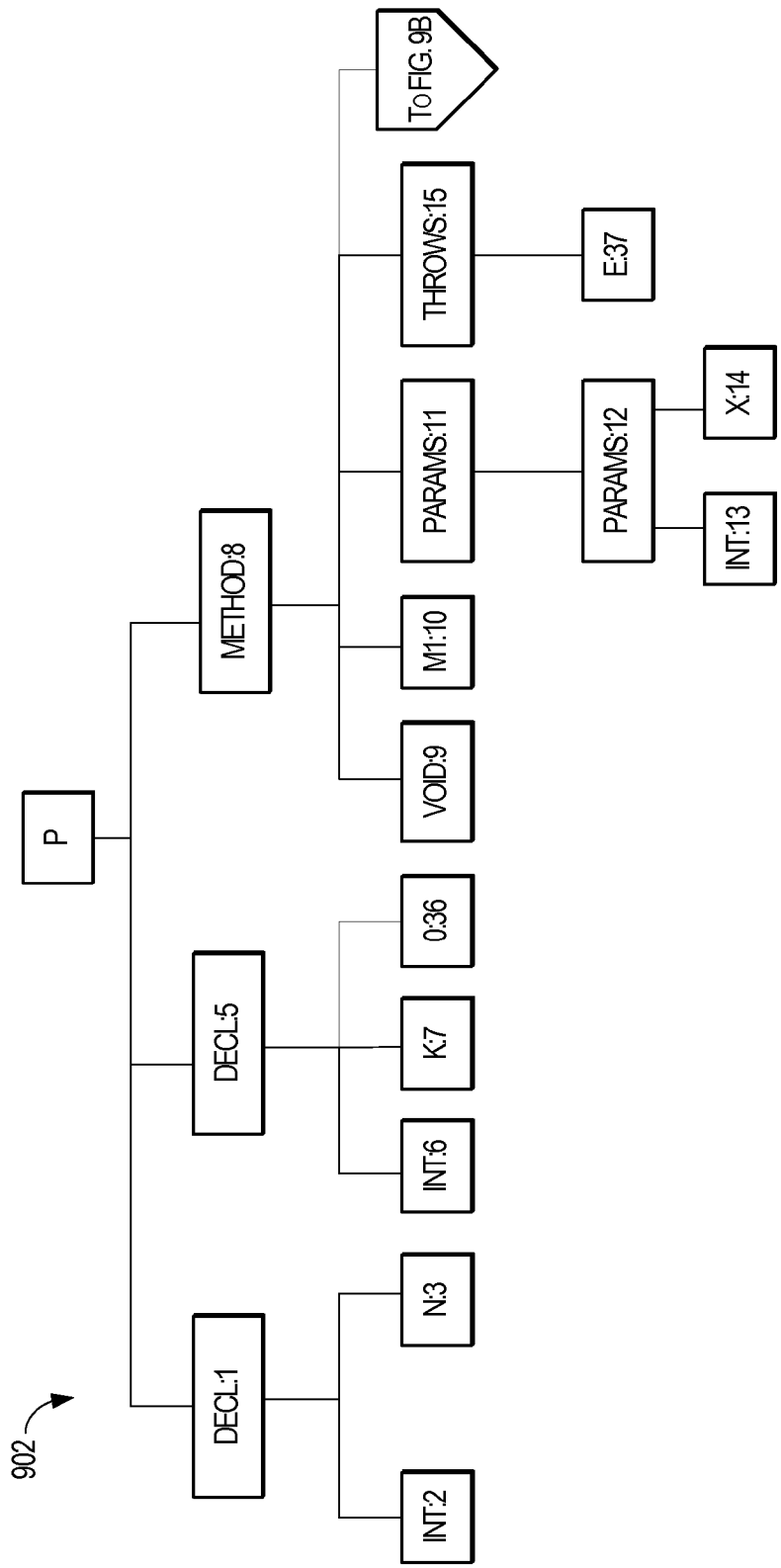
Figure 9B:
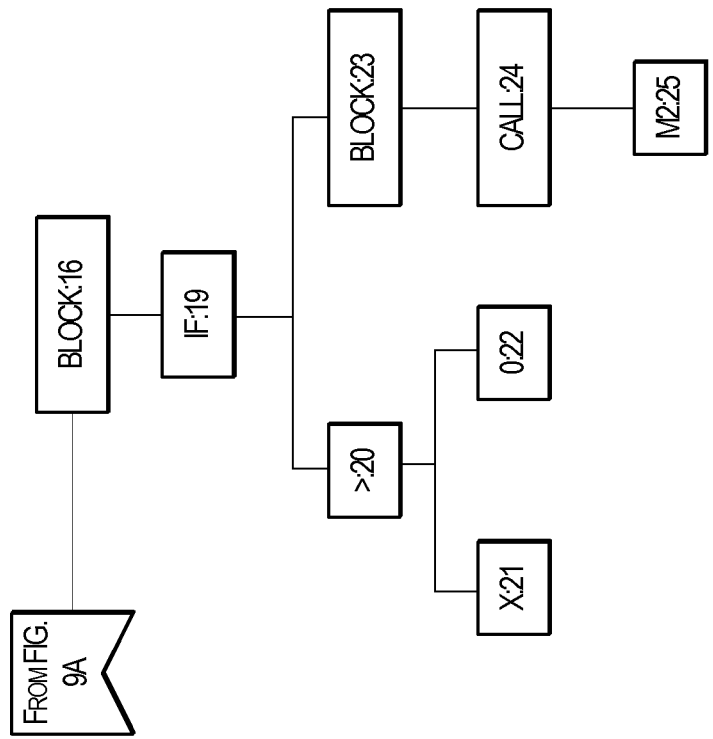
Figure 10A:
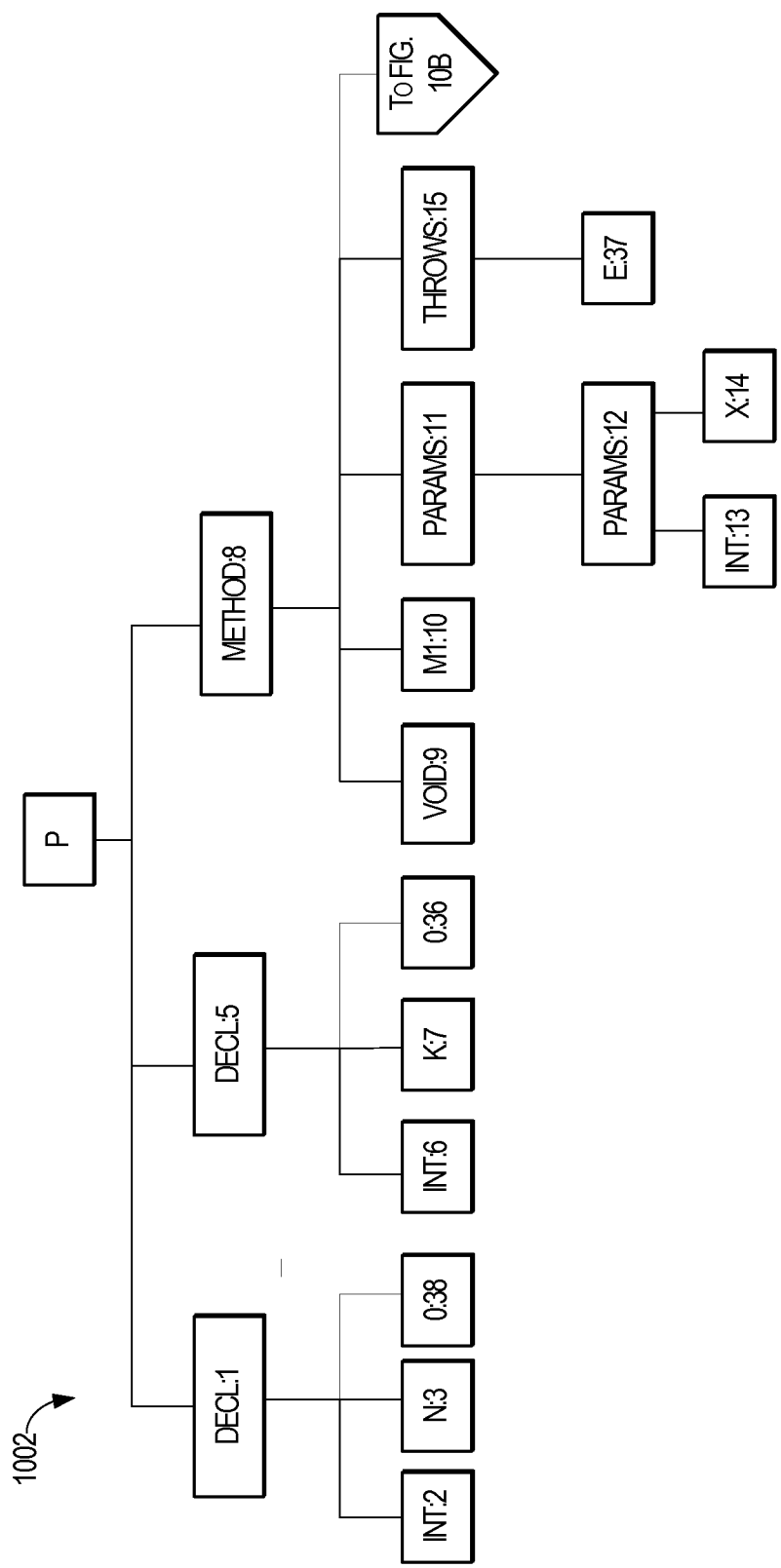
Figure 10B:
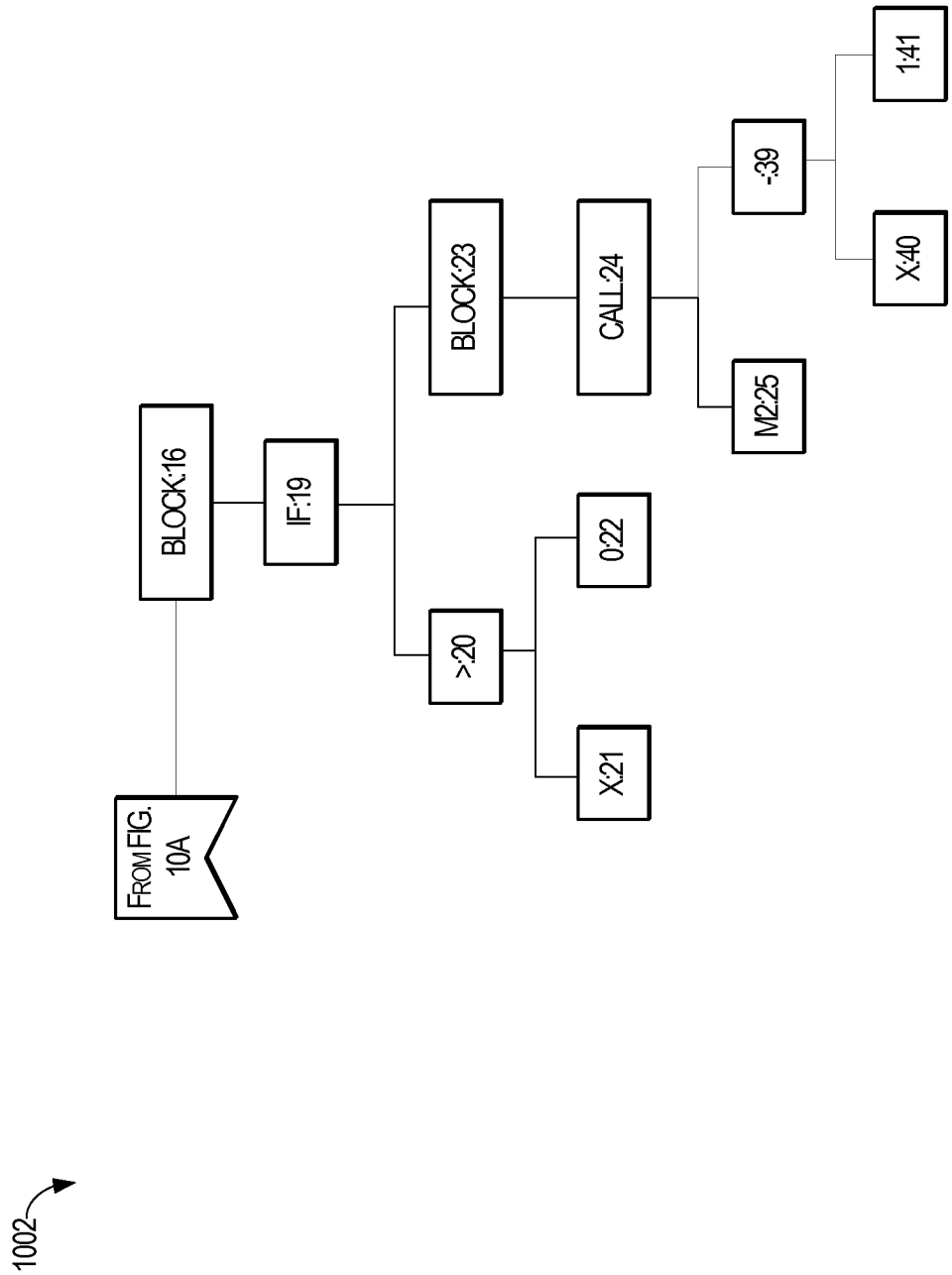

With the tree modification instructions determined by the tree comparator module 218, the tree modification module 214 applies them to the second tree representation 702, where the second tree representation 702 represents the modified source code previously submitted by D1. FIGS. 9A-9B illustrate an intermediate tree representation 902, where the tree modification module 214 has applied the "delete" instructions to the second tree representation 702. Thereafter, the tree modification module 214 applies the "insertChild" instructions to the intermediate tree representation 902. FIGS. 10A-10B illustrate a final tree representation 1002, in accordance with an example embodiment, after the "insertChild" instructions have been applied the intermediate tree representation 902.

Figure 11:
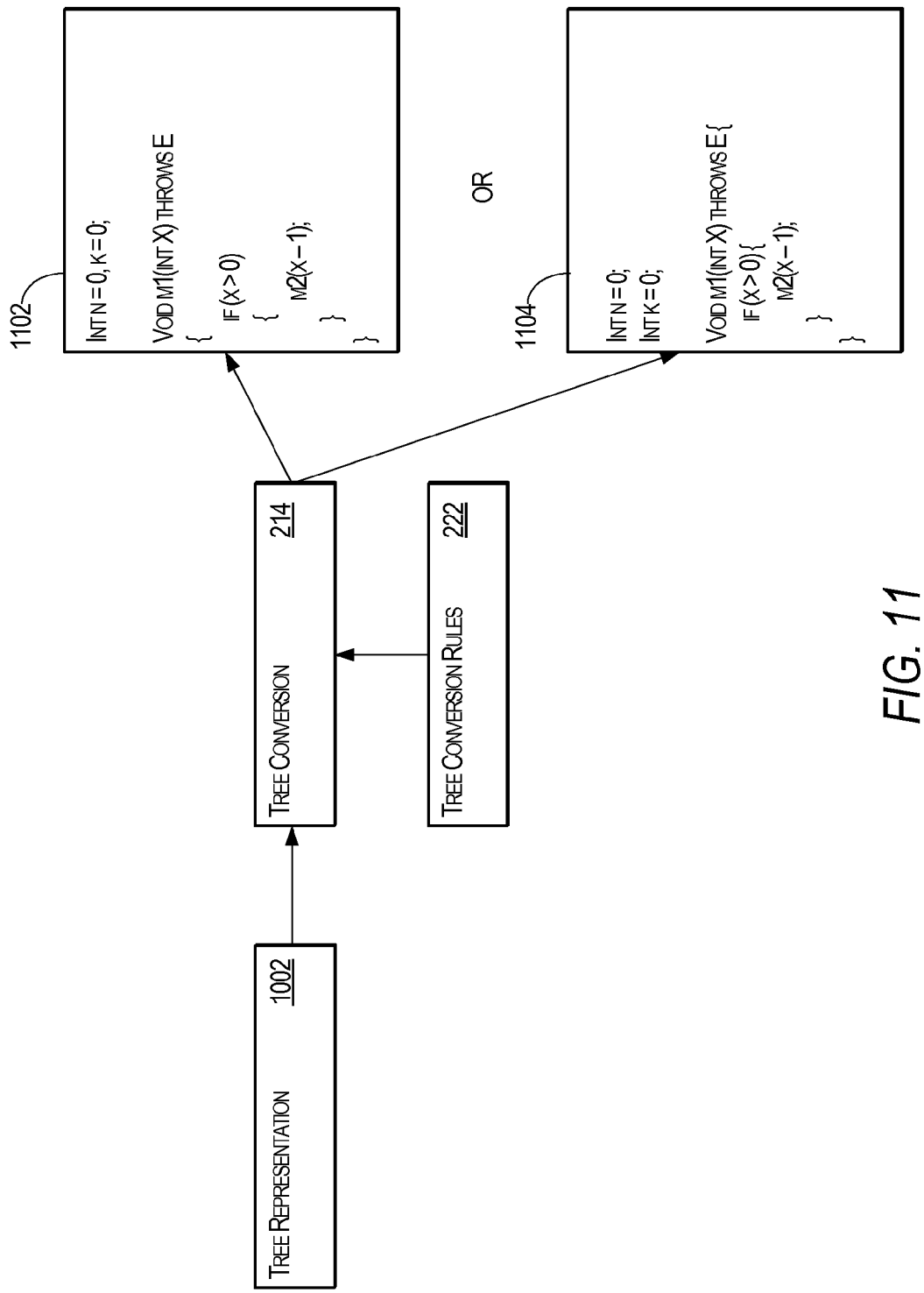
FIG. 11 illustrates converting a tree representation of source code to its text-based equivalent in accordance with an example embodiment.

After the final tree representation 1002 is obtained, the version control server 116 may convert it to text-based source code (e.g., a format readable and editable by a programmer). FIG. 11 illustrates converting the final tree representation 1002 to its text-based equivalent in accordance with an example embodiment. As shown in FIG. 11, the tree representation 1002 is provided to the tree conversion module 214, which then applies one or more tree conversion rules 222 to obtain the equivalent text-based source code. Depending on the grammar structure and semantics defined by the tree conversion rules 222, the tree conversion module 214 may produce a first text-based source code 1102 or a second text-based source code 1104, which are syntactically different but functionally equivalent. As demonstrated in the text-based source codes 1102,1104 the changes from both D1 and D2 have been incorporated into the source code maintained by the version control server 116, even though D1 committed his or her changes to the source code while D2 still had a copy of the source code checked out. Thus, unlike text-based versioning tools, the disclosed systems and methods for using tree-based versioning and merging provide a clear technical advantage in managing source code that may be concurrently checked out by multiple developers.

Figure 12A:
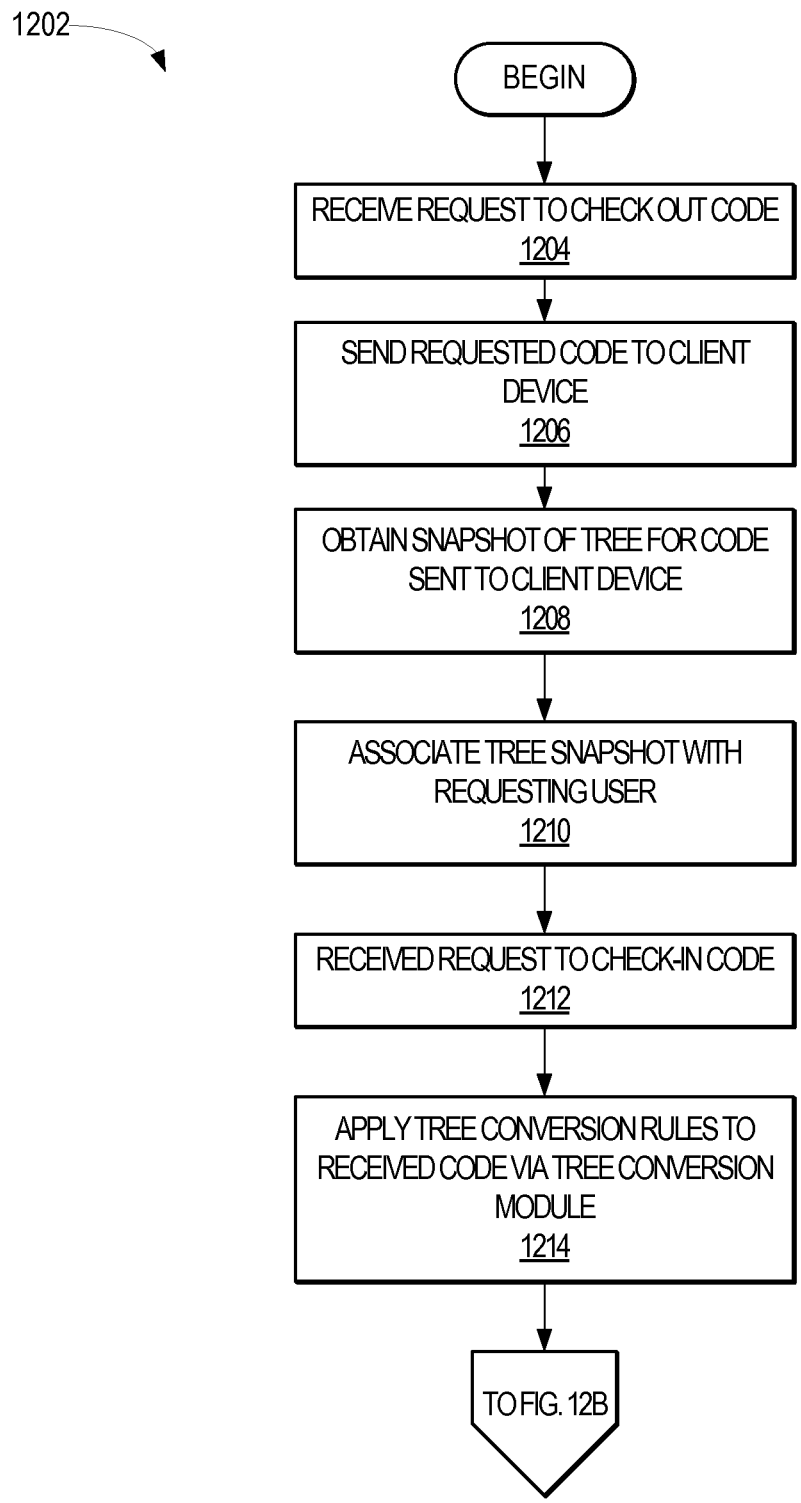
FIGS. 12A-12C illustrate a method, in accordance with an example embodiment, for tree-based versioning and merging.
Figure 12B:
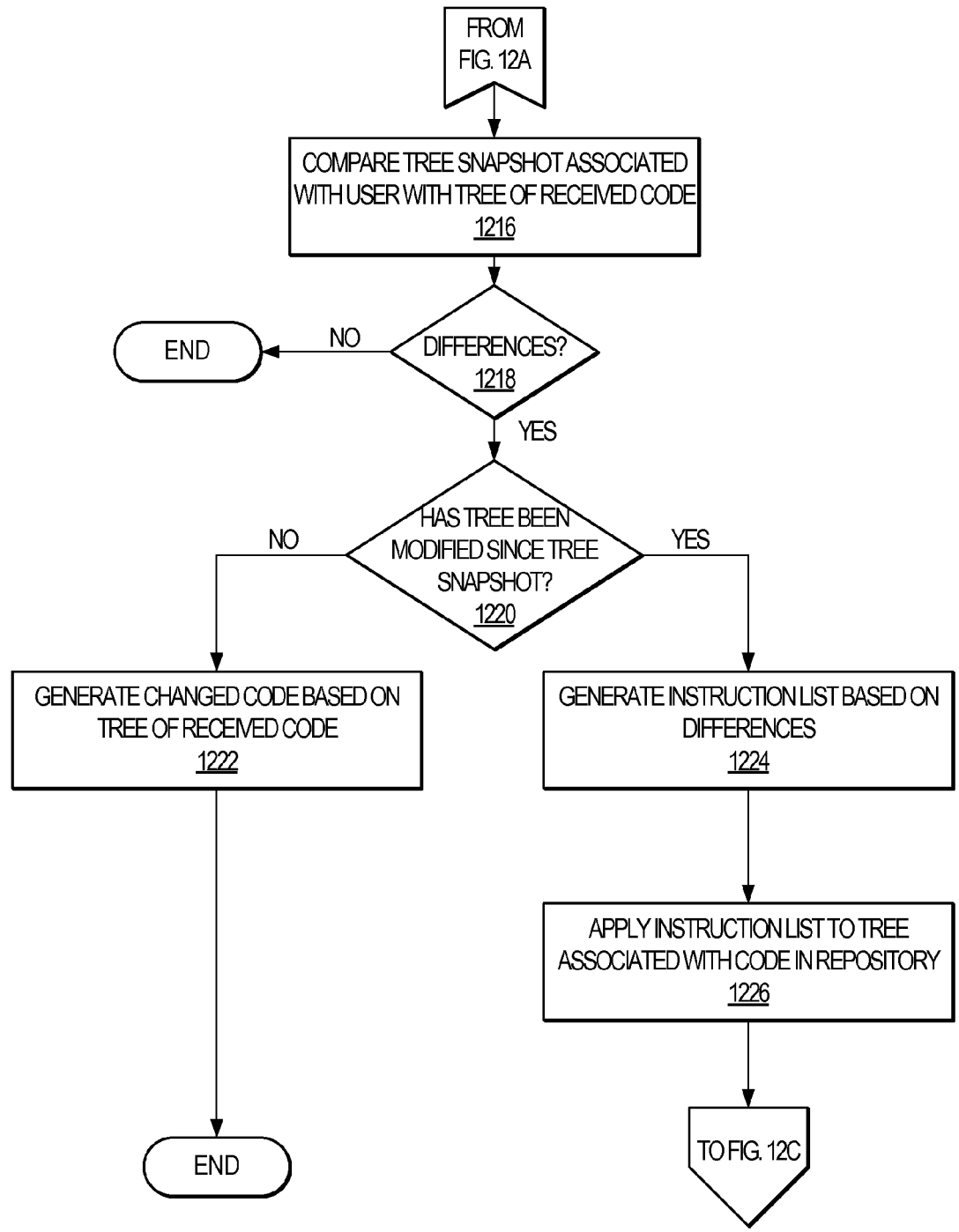
Figure 12C:
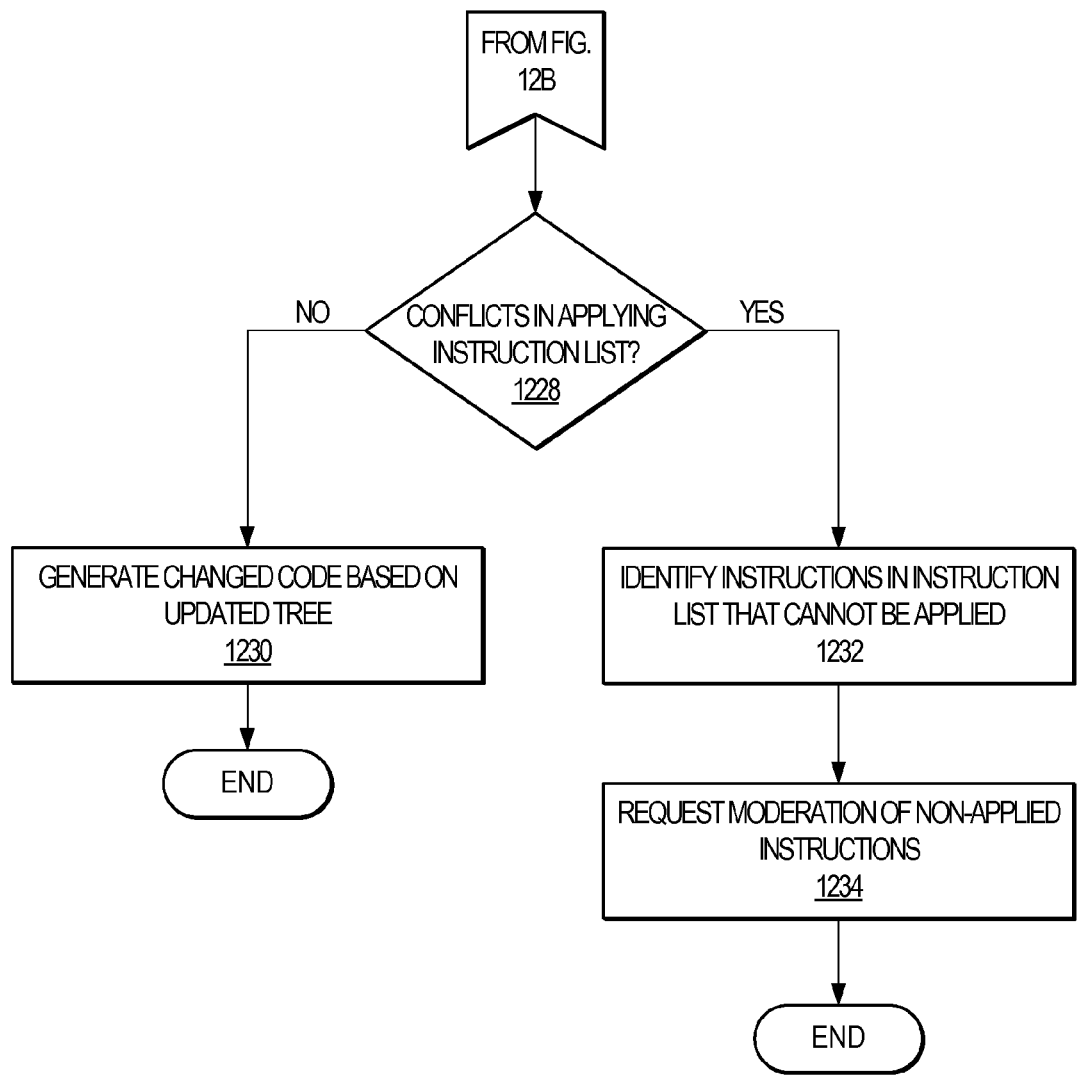

FIGS. 12A-12C illustrate a method 1202, in accordance with an example embodiment, for tree-based versioning and merging. One or more of the modules 208 may implement the operations shown in FIGS. 12A-12C and, accordingly, the method 1202 is described by a way of reference thereto.

Initially, the source code versioning module 212 receives a request to check out a file containing source code (Operation 1204). As discussed above, and in one embodiment, the version control server 116 includes a code repository 118, which is accessible by the client devices 104-108 via a network 120. The source code versioning module 212 then sends the requested file to the corresponding client device (Operation 1206). Approximately at or near the time the source code versioning module 212 sends the requested code to the requesting client device, the source code versioning module 212 invokes obtains a snapshot of the tree representation for the requested code stored in the tree representation datastore 220 (Operation 1208). Where the request for the code is the first request to be made since the code was added to the code repository 118 (including the original code or any modifications thereto), the source code versioning module 212 invokes the tree conversion module 216 to create the snapshot. Alternatively, where the request is a subsequent request, the source code retrieves the most recent snapshot created. For discussion purposes, it is presumed that the tree representation exists at the time the request for the snapshot is received. However, should the tree representation not exist, the tree conversion module 216 then creates it. The source code versioning module 212 then associates the snapshot of the tree representation with the user that requested the source code (Operation 1210).

At a later time, the source code versioning module 212 receives a request to check in the source code previously checked out (Operation 1212). As previously discussed above, the client devices 104-108 include a version control client 110-114 that facilitates the checking in and out the source code from the version control server 116. In one embodiment, the version control client 110-114 provides an indication whether the source code that was checked out was modified. Depending on whether the source code was modified, the source code versioning module 212 invokes the tree conversion module 216 to create a tree representation of the modified source code (Operation 1214). In an alternative embodiment, the source code versioning module 212 invokes the tree conversion module 216 at or near the time the checked-in source code is received from the user.

The tree comparator module 218 then compares the tree representation of the checked-in source code with the snapshot previously associated with the user (Operation 1216). The tree comparator module 218 then determines whether there are differences between the two tree representations (Operation 1218). If it is determined that there are no differences (e.g., "No" branch of Operation 1218), the method 1202 ends. The method 1202 ends because, if there are no differences between the tree representations, this means that there were no substantive changes to the source code.

Alternatively, if the tree comparator module 218 determines that there are differences (e.g., "Yes" branch of Operation 1218), the source code versioning module 212 then determines whether changes to the source code have been made since the snapshot was created and/or associated with the user (Operation 1220). This determination is made because, if the source code was modified, then the changes should be applied to a current tree representation of the source code rather than the snapshot of the tree representation.

Where the source code versioning module 212 determines that no changes have been made to the source (e.g., "No" branch of Operation 1222), the source code versioning module 212 invokes the tree conversion module 216 to generate changed code based on a tree representation of the received and modified code (Operation 1222).

However, if this determination is made in the affirmative (e.g., "Yes" branch of Operation 1220), the tree comparator module 218 generates a list of tree modification instructions 224 to apply to the snapshot associated with the user (Operation 1224). An example of such tree modification instructions 224 are discussed above with regard to FIGS. 8A-8B. The source code versioning module 212 then invokes the tree modification module 214 to apply the tree modification instructions 224 to a current tree representation of the source code stored in the code repository 118 (Operation 1226). As discussed previously, such a scenario is illustrated and explained with reference to FIGS. 6A-10B.

In applying the tree modification instructions 224, the tree modification module 214 determines whether there are any conflicts in applying such instructions 224 (Operation 1228). As discussed above, one conflict that may occur is where the tree modification instructions 224 are to be applied to a parent node that no longer exists. Should the tree modification module 214 determine that there are no conflicts (e.g., "No" branch of Operation 1228), the source code versioning module 212 then invokes the tree conversion module 216 to generate the changed source code based on the changes to its corresponding tree representation (Operation 1230). Alternatively, should the tree modification module 214 determine that there are conflicts in applying the tree modification instructions 224 (e.g., "Yes" branch of Operation 1228), the tree modification module 214 generates a list of the one or more tree modification instructions that could not be applied (Operation 1232). The tree modification module 214 then requests moderation, such as by the user attempting to check in the changed source code, to resolve the identified conflicts (Operation 1234).

In this manner, the disclosed systems and methods provide a tree-based versioning and merging approach to modifying source code that can be concurrently checked out by multiple users. Unlike text-based tools or applications, the disclosed systems and methods leverage a tree representation of the source code to determine and/or apply changes to source code. This approach has at least one technical advantage over text-based tools and applications in that it reduces the number of potential conflicts resulting from changes to source code and that it focuses on substantive changes to the source code, rather than those changes that are merely grammatical. Further, the developer is free to choose the preferred code format when editing. The developer does not have to compromise on code formatting rules (position of braces, choosing between using spaces or tabs, etc.) and then continue with them to avoid conflicts purely of a formatting nature since such conflicts do not exist in the tree representation.

Furthermore, while the foregoing modules 208 and data 210 have been discussed with reference to the version control server 116, one of ordinary skill in the art will recognize that such modules and/or data could also be implemented on one or more client devices 104-108. For example, and without limitation, the client devices 104-108 could include a local tree conversion module that converts source code to its corresponding tree representation. As another example, the client devices 104-108 may locally store the snapshot of the tree representation associated with the checked out source code such that the version control server 116 is relieved from having to associate snapshots with corresponding users. In this manner, some of the modules and/or functionalities performed by the version control server 116 may instead be performed locally on one or more of the client devices 104-108.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-12C are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Architecture and Machine-Readable Medium

Figure 13:
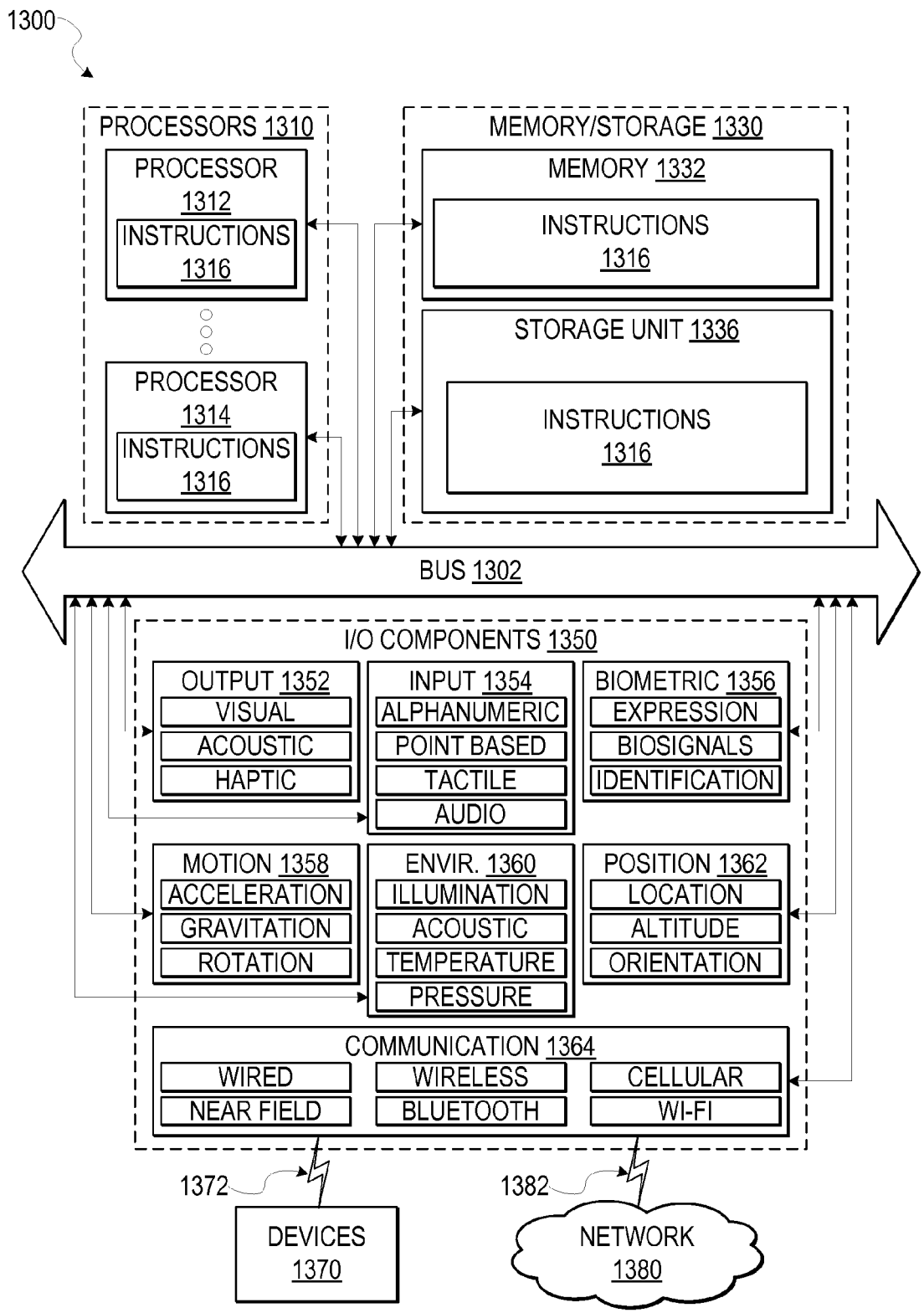
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example the instructions may cause the machine to execute the message passing or method diagrams of FIGS. 12A-12C. Additionally, or alternatively, the instructions may implement the modules 208 of FIG. 2. The instructions transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core process), multiple processors with a single core, multiple processors with multiples cores, or any combination thereof.

The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of processors 1310 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 may include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 13130 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system for tree-based computer code versioning and merging, the system comprising:
   a repository comprising a first file that includes source code for a computer program;
   a tree conversion module, using at least one processor, configured to:
      convert the source code of the first file to a first tree representation, the first tree representation comprising a first plurality of nodes, each node of the first plurality of nodes representing a constituent part of the source code of the first file;
   a source code versioning module, using at least one processor, configured to:
      receive a first request for a copy of the first file from the repository;
      invoke, in response to receiving the first request, the tree conversion module to obtain a snapshot of the first tree representation;
      provide the copy of the first file in response to the first request;
      receive, after the first request, a second request to store a second file in the repository as a current version of the first file, the second file comprising the source code of the copy of the first file and at least one change to the source code of the copy of the first file, the first request and the second request being associated with a first user;

invoke the tree conversion module to obtain a second tree representation of the second file in response to receiving the second request, the second tree representation comprising a second plurality of nodes;

determine, in response to receiving the second request, whether the first file in the repository has been modified since the copy of the first file was provided;

invoke, based on a determination that the first file in the repository has not been modified since the copy of the first file was provided, the tree conversion module to generate a first new version of the first file based on the second tree representation; and store the first new version of the first file in the repository as the current version of the first file;

a tree comparator module, using at least one processor, configured to:

identify, based on a determination that the first file in the repository has been modified since the copy of the first file was provided, differences between the snapshot of the first tree representation and the second tree representation by comparing the first plurality of nodes with the second plurality of nodes; and a tree modification module, using at least one processor, configured to:

modify a third tree representation of the source code based on the identified differences between the snapshot of the first tree representation and the second tree representation, the third tree representation being a tree representation of the current version of the first file in the repository;

the source code versioning module further configured to:

invoke the tree conversion module to generate a second new version of the first file based on the modified third tree representation; and store the second new version of the first file in the repository as the current version of the first file.

2. The system of claim 1, wherein the constituent part of the source code of the first file comprises at least one of a parameter, a parameter value, or a source code identifier, the source code identifier identifying a source code type for a given portion of the source code of the first file.

3. The system of claim 1, wherein the third tree representation is associated with a second user different from the first user.

4. The system of claim 1, wherein the tree comparator module is further configured to generate a list of instructions for modifying the third tree representation based on the identified differences between the snapshot of the first tree representation and the second tree representation.

5. The system of claim 1, wherein the third tree representation corresponds to modifications of the source code of the first file after the snapshot of the first tree representation is obtained.

6. The system of claim 1, wherein the tree comparator module is further configured to:

identify at least one conflict in the modification of the third tree representation; and in response to the identified at least one conflict, request moderation of the modification of the third tree representation.

7. A method for tree-based computer code versioning and merging, the method comprising:

converting, by at least one processor, source code of a first file to a first tree representation, the first tree representation comprising a first plurality of nodes, each node of the first plurality of nodes representing a constituent part of the source code of the first file;

receiving a request for a copy of the first file from a repository;

obtaining, in response to receiving the first request, a snapshot of the first tree representation;

receiving, after the first request, a second request to store a second file in the repository as a current version of the first file, the second file comprising the source code of the copy of the first file and at least one change to the source code of the copy of the first file, the first request and the second request being associated with a first user;

obtaining a second tree representation of the second file in response to receiving the second request, the second tree representation comprising a second plurality of nodes;

determining, in response to receiving the second request, whether the first file in the repository has been modified since the copy of the first file was provided;

based on a determination that the first file in the repository has not been modified since the copy of the first file was provided, generating a first new version of the first file based on the second tree representation, and storing the first new version of the first file in the repository as the current version of the first file; and based on a determination that the first file in the repository has been modified since the copy of the first file was provided, identifying differences between the snapshot of the first tree representation and the second tree representation by comparing the first plurality of nodes with the second plurality of nodes, modifying a third tree representation of the source code based on the identified differences between the snapshot of the first tree representation and the second tree representation, the third tree representation being a tree representation of the current version of the first file in the repository, generating a second new version of the first file based on the modified third tree representation, and storing the second new version of the first file in the repository as the current version of the first file.

8. The method of claim 7, wherein the constituent part of the source code of the first file comprises at least one of a parameter, a parameter value, or a source code identifier, the source code identifier identifying a source code type for a given portion of the source code of the first file.

9. The method of claim 7, wherein the third tree representation is associated with a second user different from the first user.

10. The method of claim 7, further comprising:

generating a list of instructions for modifying the third tree representation based on the identified differences between the snapshot of the first tree representation and the second tree representation.

11. The method of claim 7, wherein the third tree representation corresponds to modifications of the source code of the first file after the snapshot of the first tree representation is obtained.

12. The method of claim 7, further comprising:

identifying at least one conflict in the modification of the third tree representation; and in response to the identified at least one conflict, requesting moderation of the modification of the third tree representation.

13. A machine-readable medium, excluding signals per se, having instructions stored thereon that, when executed by at least one processor of a machine, cause the machine to perform operations comprising:
- converting source code of a first file to a first tree representation, the first tree representation comprising a first plurality of nodes, each node of the plurality of nodes representing a constituent part of the source code of the first file;
- receiving a request for a copy of the first file from a repository;
- obtaining, in response to receiving the first request, a snapshot of the first tree representation;
- receiving, after the first request, a second request to store a second file in the repository as a current version of the first file, the second file comprising the source code of the copy of the first file and at least one change to the source code of the copy of the first file, the first request and the second request being associated with a first user;
- obtaining a second tree representation of the second file in response to receiving the second request, the second tree representation comprising a second plurality of nodes;
- determining, in response to receiving the second request, whether the first file in the repository has been modified since the copy of the first file was provided;
- based on a determination that the first file in the repository has not been modified since the copy of the first file was provided,
  - generating a first new version of the first file based on the second tree representation, and
  - storing the first new version of the first file in the repository as the current version of the first file; and
- based on a determination that the first file in the repository has been modified since the copy of the first file was provided,
  - identifying differences between the snapshot of the first tree representation and the second tree representation by comparing the first plurality of nodes with the second plurality of nodes; and
  - modifying a third tree representation of the source code based on the identified differences between the snapshot of the first tree representation and the second tree representation, the third tree representation being a tree representation of the current version of the first file in the repository,
  - generating a second new version of the first file based on the modified third tree representation, and
  - storing the second new version of the first file in the repository as the current version of the first file.

14. The machine-readable medium of claim 13, wherein the constituent part of the source code of the first file comprises at least one of a parameter, a parameter value, or a source code identifier, the source code identifier identifying a source code type for a given portion of the source code of the first file.

15. The machine-readable medium of claim 13, wherein the third tree representation is associated with a second user different from the first user.

16. The machine-readable medium of claim 13, wherein the operations further comprise:
- generating a list of instructions for modifying the third tree representation based on the identified differences between the snapshot of the first tree representation and the second tree representation.

17. The machine-readable medium of claim 13, wherein the third tree representation corresponds to modifications of the source code of the first file after the snapshot of the first tree representation is obtained.

18. The machine-readable medium of claim 13, wherein the operations further comprise:
- identifying at least one conflict in the modification of the third tree representation; and
- in response to the identified at least one conflict, requesting moderation of the modification of the third tree representation.

* * * * *